G. F. POTTLE.
Governor for Steam-Engines.

No. 222,946. Patented Dec. 23, 1879.

WITNESSES.
Frank G. Parker
William Eason

INVENTOR.
George F. Pottle

UNITED STATES PATENT OFFICE.

GEORGE F. POTTLE, OF BOSTON, MASSACHUSETTS.

IMPROVEMENT IN GOVERNORS FOR STEAM-ENGINES.

Specification forming part of Letters Patent No. 222,946, dated December 23, 1879; application filed May 1, 1879.

*To all whom it may concern:*

Be it known that I, GEORGE F. POTTLE, of Boston, in the county of Suffolk and State of Massachusetts, have invented new and useful Improvements on Governors for Steam-Engines and other Motors, of which the following is a specification.

The nature of my invention consists in combining, with a revolving shaft, a spiral thread, and a screw-nut having resisting wings or fans, an inclosing-chamber filled with oil or some other suitable resisting fluid, the whole being so arranged that the resistance to the wings or fans on the nut will prevent the same from revolving as fast as the shaft, and thus give the nut a tendency to traverse the shaft longitudinally. This tendency of the nut to revolve and move on the shaft is resisted, to a certain extent, by a weighted lever; but the resistance thus offered is not sufficient to withstand a too rapid velocity of the shaft, in which case the lever operates on a valve or other chuck device, and through it upon the motive force, and thus regulates the velocity of the shaft and motor.

In other devices for effecting this purpose—for instance, the M. Muchin device, Patent No. 158,300, dated December 29, 1874, and the device patented by MacGeorge in England, 1874—the resistant wheels or fans are exposed in the open air, and they do not run in any confined fluid. This arrangement has been proved to be entirely inadequate for a governor, and has long been discarded by practical operators. Another device that has been tried for this purpose, invented by John A. Lynch, and described in Patent No. 112,159, employs a helical cam-lifter, in combination with rolls and a propeller, all together constituting a complicated device, which is very limited in its scope and very liable to be out of repair.

The object of my invention is to so construct and combine the several parts of the propeller-governor as to obviate all objections to former devices of this class and to produce a reliable and simple instrument.

Figure 1:
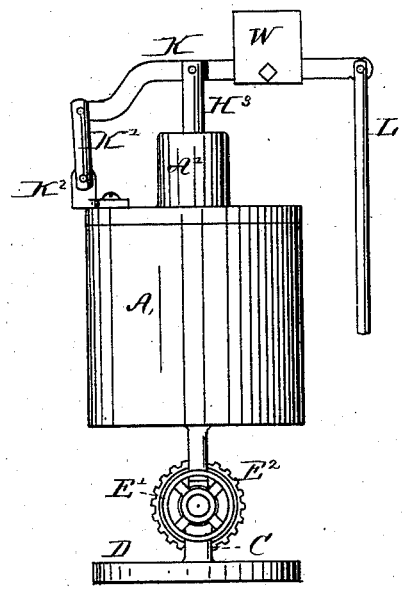
Figure 2:
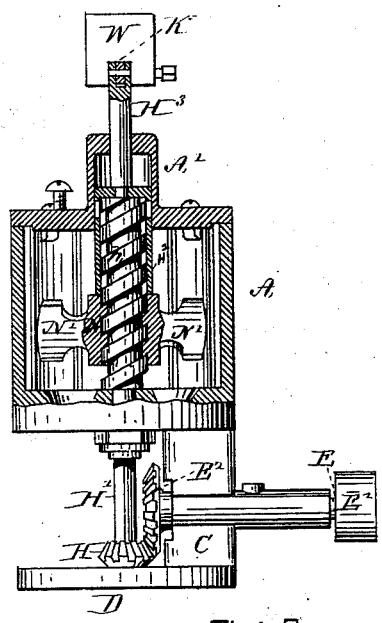
Figure 3:
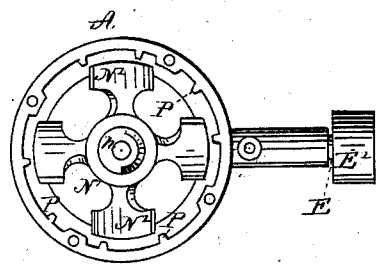

In the drawings, Figure 1 is an elevation of my invention. Fig. 2 is a view, part in elevation and part in section. Fig. 3 is a plan of the inside, the top being removed.

The form of my device is entirely immaterial; but I have adopted the one shown in the drawings as a convenient one.

A represents a cylindrical chamber supported upon a stand, C, and base D. Within and extending from this chamber A, I place a shaft, H', said shaft having a screw-thread, $h$, Fig. 2, upon it. This shaft H' is driven by a belt from the motor, which acts on the pulley E', and, through it and the shaft E, upon the gear $E^2$, which in turn engages with the gear H on the shaft H'.

N is a screw-nut having resisting wings or arms N' N'. (See Figs. 2 and 3.) $H^2$ is a tube fitting loosely upon the screw-shaft H', its lower end resting on the nut N, its upper end terminating in a stem, $H^3$, which passes up through the cap A', Figs. 1 and 2.

The stem $H^3$ is connected to a weighted lever, K, which is held by a link, K', to the bracket $K^2$. W is a weight, which may be moved back and forth on the lever K, to regulate the amount of resistance to be offered by the tube $H^2$ to prevent the nut N from rising on the shaft H'. L is a link to connect the lever K to the regulator-valve or other check device of the motor.

P P, &c., are vertical projections made on the interior of the chamber A, and serve to resist the flow of the fluid when the nut is caused to revolve.

The action of my invention is as follows: The chamber A is filled with oil or pulverized plumbago, &c., or even the ordinary atmosphere, and the device is connected with the motor. The link L is attached to the regulator-valve, and the whole adjusted so that the fan-nut N N' will remain at the bottom of the chamber so long as the motor is doing its maximum work and running at the normal speed. Now, if the motor is freed from some of its work, then the velocity will increase, and the fan-nut N N' will rise, and, acting through the tube $H^2$ and stem $H^3$, lift the lever K, and through it cause the regulator-valve to cut off the supply from the motor.

I claim—

The combination of the revolving screw-shaft H', the screw-nut N, fans N', and the fluid-inclosing chamber A with the lifting-tube $H^2$, stem $H^3$, and weighted lever K, substantially as described, and for the purpose set forth.

GEORGE F. POTTLE.

Witnesses:
WILLIAM EDSON,
C. H. BASS.